No. 759,128. PATENTED MAY 3, 1904.
C. L. PLUMER.
APPARATUS FOR COOKING FRUIT.
APPLICATION FILED AUG. 15, 1902.
NO MODEL.
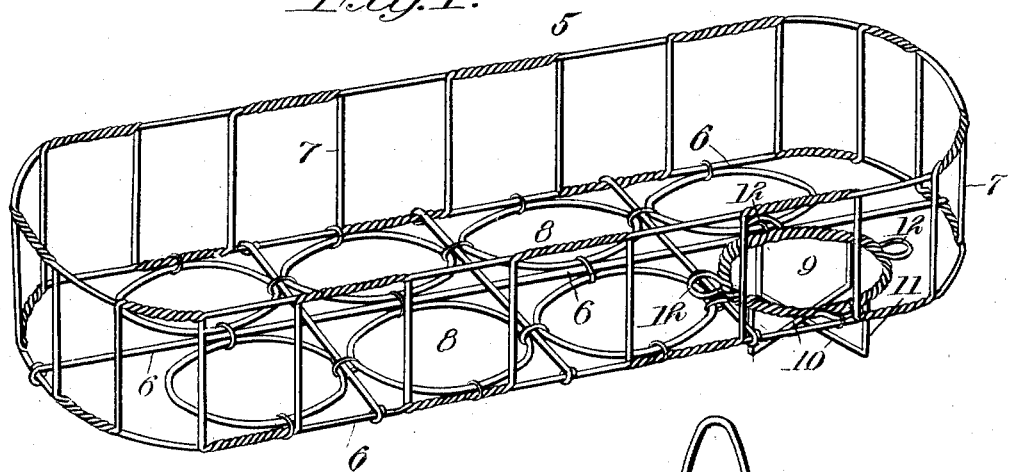
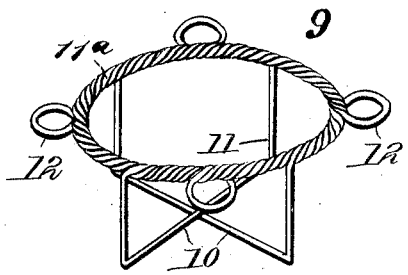
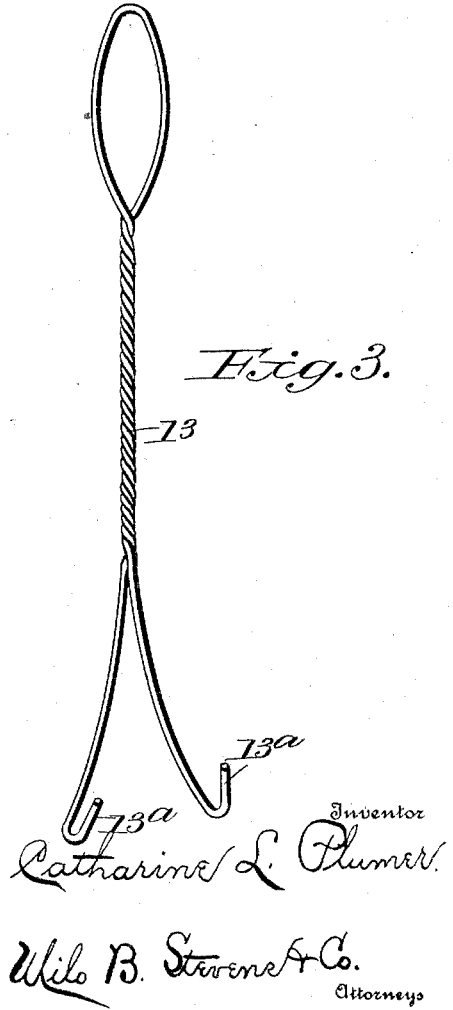
Witnesses
C. H. Walker
M. A. Schmidt
Inventor
Catharine L. Plumer
By Milo B. Stevens & Co.
Attorneys No. 759,128. Patented May 3, 1904.

UNITED STATES PATENT OFFICE.

CATHARINE L. PLUMER, OF MILACA, MINNESOTA.

APPARATUS FOR COOKING FRUIT.

SPECIFICATION forming part of Letters Patent No. 759,128, dated May 3, 1904.

Application filed August 15, 1902. Serial No. 119,799. (No model.)

*To all whom it may concern:*

Be it known that I, CATHARINE L. PLUMER, a citizen of the United States, residing at Milaca, in the county of Millelacs and State of Minnesota, have invented certain new and useful Improvements in Apparatus for Cooking Fruit; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in apparatus for cooking fruit, and comprises a woven-wire or open-work tray the bottom of which has a series of openings to receive holders containing jars of fruit.

My invention has for its object to provide an apparatus which will permit the jars of fruit after being cooked to be removed, either simultaneously or separately, from the boiler without danger of burning the hands of the operator. The holder which contains each jar is provided with loops or ears into which a lifter may be inserted, and thus each jar may be separately removed from the boiler. This is very desirable, as to lift all the jars at one time is usually beyond the strength of the average woman.

In the drawings, Figure 1 is a perspective view, one of the jar-holders being shown in position in the tray. Fig. 2 is a perspective view of a jar-holder. Fig. 3 is a side elevation of the lifter.

Referring particularly to the drawings, 5 indicates a tray, preferably constructed of wire, which is bent to form a bottom 6 and sides 7. In the bottom I form a series of openings 8 to receive the jar-holders 9. Said jar-holders are also, preferably, constructed of wire which is bent to form a bottom 10, sides 11, and a circular rim $11^a$. On said rim a number of loops or ears 12 are formed, into which the hooks $13^a$ of a lifter 13 (shown in Fig. 3) may be inserted and the holders removed from the tray. Said loops also serve to support the holders in the tray when the same is lifted, as they extend over and rest on the edges of the openings 8.

In use the jars containing the fruit or other articles to be cooked are placed in the holders 9, which are then placed in the openings 8 of the tray 5. The tray is placed in a boiler containing water, which is then heated to the boiling-point. When the contents of the jars are sufficiently cooked and it is desired to remove them from the boiler, the lifter 13 is hooked into the loops 12 and the holder 9, containing the jar, is lifted out of the boiler. All of the jars may be taken out of the boiler at one time by removing the tray, the holders being supported therein by the loops 12, as heretofore described; but this is usually not desirable because of the weight of the jars. The tray may be of a shape and capacity adapted to receive any desired number of jars, a tray for containing eight jars being shown in the drawings. By making the tray and jar-holders of wire the bottoms and sides of both are open, permitting the free circulation of the boiling water around the jars.

It will be seen that my apparatus is simply and cheaply made and most effective in its operation.

Having thus described my invention, what is claimed as new, and desired to be secured by Letters Patent, is—

1. The combination with an open-work tray having openings in the bottom thereof, of removable jar-holders suspended in said openings, substantially as shown and described.

2. The combination with a tray having openings in the bottom thereof, of removable jar-holders, having projections engaging the bottom of the tray, by which they are suspended in said openings, substantially as shown and described.

In testimony whereof I affix my signature in presence of two witnesses.

CATHARINE L. PLUMER.

Witnesses:
 WESLEY S. FOSTER,
 R. VAN MILL.